United States Patent
Lawin

(10) Patent No.: US 8,959,406 B2
(45) Date of Patent: Feb. 17, 2015

(54) METHOD FOR DATA PACKET PROCESSING AT VERY HIGH DATA RATES AND EXTREMELY POOR TRANSMISSION CONDITIONS

(75) Inventor: Mirko Lawin, Meiningen (DE)

(73) Assignee: ADVA Optical Networking SE, Meiningen (DE)

( * ) Notice: Subject to any disclaimer, the term of this patent is extended or adjusted under 35 U.S.C. 154(b) by 124 days.

(21) Appl. No.: 13/545,968

(22) Filed: Jul. 10, 2012

(65) Prior Publication Data

US 2013/0019129 A1 Jan. 17, 2013

(30) Foreign Application Priority Data

Jul. 12, 2011 (EP) ..................................... 11401548

(51) Int. Cl.
*G06F 11/07* (2006.01)
*H04L 7/04* (2006.01)
*H04L 1/20* (2006.01)

(52) U.S. Cl.
CPC . *H04L 7/042* (2013.01); *H04L 1/20* (2013.01); *G06F 11/07* (2013.01)
USPC .................................. 714/704; 714/E11.004

(58) Field of Classification Search
USPC ......... 714/704, 706, 707, 715, 716, 789, 775, 714/774, 798
See application file for complete search history.

(56) References Cited

U.S. PATENT DOCUMENTS

| | | | |
|---|---|---|---|
| 6,400,734 B1 * | 6/2002 | Weigand | 370/514 |
| 8,446,800 B2 * | 5/2013 | Abe | 368/47 |
| 2007/0124625 A1 * | 5/2007 | Hassan et al. | 714/704 |
| 2008/0031284 A1 | 2/2008 | Alderson et al. | |
| 2009/0271465 A1 * | 10/2009 | Pistorius et al. | 708/670 |

FOREIGN PATENT DOCUMENTS

EP 0 794 485 A1 9/1997
WO WO 2008/126051 A2 10/2008

* cited by examiner

*Primary Examiner* — Albert Decady
*Assistant Examiner* — Christian Dorman
(74) *Attorney, Agent, or Firm* — The Culbertson Group, P.C.

(57) ABSTRACT

Provided are systems and methods for adaptive, error-tolerant pattern recognition in the transmission of digital data packets, in which an actual data pattern, including several bits, is detected and is compared with a theoretical data pattern; erroneous and/or correctly recognized bits are detected; erroneous and/or correctly recognized bits are added up (in each case); and the error sum (number of the errors) of the added-up erroneous bits is compared with a specifiable and changeable admissible maximum number of errors.

12 Claims, 2 Drawing Sheets

METHOD FOR DATA PACKET PROCESSING AT VERY HIGH DATA RATES AND EXTREMELY POOR TRANSMISSION CONDITIONS

FIELD OF THE INVENTION

The invention concerns a method for the synchronization of data packets, which are plagued with very high error rates, and their data rate adaptation by means of adaptive error-tolerant pattern recognition, in particular, in optical telecommunications at data rates higher than 40 gigabits per second and higher-value modulated signals.

BACKGROUND

In data transmission, in the transmission of digital data packets (frames) in particular, so-called synchronization words (sync patterns) are used for the synchronization of the recipient. With their help, the recipient finds the beginning of the frames in the serial data flow. Frame synchronization mechanisms which are common at present and work according to this principle run into limits, especially for the startup of the systems, at very high bit error rates, for example, higher than $10^{-2}$ or 1 percent, higher than 5 percent or even higher than 10 percent. With bandwidths in the order of magnitude of 40 gigabits per second and above, in particular, in fiber-optical telecommunications, nearly permanent bit errors are present in the data flow. Here, a forward error correction (FEC—Forward Error Correction) is necessary, so as to mathematically correct the bit errors present.

Since the FEC can, as a rule, work only after a successful frame synchronization, more and more efficient synchronization mechanisms are required. To attain even higher data rates, transmission methods with higher-value modulation are increasingly used, especially in fiber-optical data transmission. The more complex transmission technology needed for this, and the mostly poor signal-to-noise ratios, as a result of these modulation modes, additionally complicate the transmission. FEC methods for the correction of the data field in the frame must therefore be improved constantly.

For the frame synchronization as the basis of the frame processing, new error-tolerant methods are also needed because of the reasons given above, since the efficiency and/or applicability of the already existing methods for the error-tolerant frame synchronization are limited under extreme conditions.

Traditional methods synchronize with respect to specific bit patterns in the data frame head. To this end, state machines, which work as follows and are shown in FIG. 1, are used:

The data flow is first permanently scanned, as shown in FIG. 2, in the so-called "async status". If a bit pattern is not recognized, the data are shifted by one bit (bit-by-bit pattern comparison). If the mechanism recognizes the expected bit pattern for the first time, for example—as shown in FIG. 2—after the mth comparison, a so-called "presync status" is assumed and a counter is started, which counts the data passing through. If this counter has attained a counter level, which corresponds to the data packet length (frame length), the data frame head with the corresponding synchronization pattern would now have to again pass by. This is tested with a renewed bit pattern comparison. If the comparison is positive, the data counter is again reset and restarted—that is, shifted by a complete frame length. The process (for this pattern comparison at a frame interval, the data are always shifted by a complete frame length) is repeated several times. If, within a stipulated number of bit comparisons in the data frame head, the bit pattern is not recognized once or several times, the system goes back to the "async status" and the scanning begins from the beginning. If the comparison is positive each time after a defined number of repetitions, the state machine assumes the "sync status." One assumes that after a repeated synchronization pattern, correctly recognized in the data frame head, a synchronization is attained. In the "sync status," a bit pattern comparison now periodically takes place in the data frame head. If the comparison is negative once or several times, the "presync status" is assumed. There, the data frame is again periodically scanned according to the sync pattern. After a previously stipulated number of erroneous comparisons, the system falls into the "async status." If the bit pattern is again recognized correctly several times before this, the state machine again assumes the "sync status."

This procedure functions, however, only if the total bit error number in the data frame head is, on average, so small that the expected synchronization patterns are recognized correspondingly often. If the erroneous comparisons are greater than specified in the state machines, the mechanism cannot be synchronized. In this case, one could eventually make possible a synchronization by varying the prespecified number of erroneous comparisons in the state machine. However, that functions only with freely programmable systems. With electronic components usually used in data communication, that is not possible. If bit errors are permanently present in the data frame head, the methods which work according to the principle described above, without error tolerance, fail completely.

The OTN synchronization mechanisms are very closely based on the principles of the SDH and SONET protocols. In the ethernet world, the data frame synchronization is implemented with the aid of fixed bit patterns. Fiber channel protocols are similarly specified.

What all aforementioned mechanisms have in common is that synchronization is carried out with respect to a precisely defined bit pattern. If the bit pattern is not exactly the same, then the individual comparison fails. A certain blurring can be attained by a multiple comparison—this is not variable, however, and ineffective in the comparison pattern with permanent bit errors.

In German publication DE 697 21 364 T2 and the analogous U.S. Pat. No. 5,943,377, a method for an error-tolerant and quick detection of a bit pattern in a bit pattern flow is also proposed. A candidate bit pattern in the form of a specific number of bits is hereby formed from the bit flow. Then, the candidate bit pattern is used as an address to address positions in a table. Each position in the table comprises information on the hits, which define a hit if the address of a position corresponds to any of the prespecified bit patterns or the falsifications which lie within the error tolerance.

As has become evident with the aid of experiments, all aforementioned methods and systems, however, still do not make possible data packet synchronization and data rate adaptation with extremely high bit error rates. With permanent bit errors in the synchronization pattern of the data frame and/or in the idle data designation field, these methods lack usefulness because of their operating principle.

SUMMARY OF THE INVENTION

Provided herein are a system and method to make possible a data packet synchronization and data rate adaptation at extremely high bit error rates and with permanent bit errors in the synchronization pattern of the data frame and/or in the idle data designation field.

Methods of the adaptive error-tolerant pattern recognition, in accordance with the invention, also make possible, in extreme cases, a successful synchronization. By means of a special high-speed method, the Hamming distance between the n bit-long (preferably, one or more bytes) synchronization word or theoretical pattern and the currently actual n bit-long data comparison pattern or actual pattern is determined. The current Hamming distance is then compared with the admissible Hamming distance. By a preferable step-by-step variation, in particular, an increase in single steps, begun with a specifiable initial value (for example, "0"), of the admissible Hamming distance, an adaptation to the current bit error rate takes place, wherein a successful synchronization is attained and can be maintained. The variation of the admissible Hamming distance can take place in real time.

Another important function in the frame-based data transmission is the data rate adaptation (stuffing) between frame input data on the sender and frame output data on the recipient, which takes place by the insertion of corresponding filler words (idles) into the frame. The recipient must recognize whether an idle or a data work is present on the corresponding sites in the frame. This information gives an additional data-idles designation field. Data must always be sent on; idles are removed. If there is no FEC-corrected frame here yet or if the FEC is not able to correct a correspondingly high bit error number, then this designation field may be erroneous. Then, considerable secondary errors appear, because the data packet rate temporarily no longer agrees; data are missing; or idles are sent on as data.

In order to prevent such problems, an adaptive, error-tolerant pattern recognition, in accordance with the invention can also be used. The method, in accordance with the invention, also works here, error-free, up to an error rate of almost 50%—that is, approximately half, namely (½ n-1) of the bits in the designation field, as actual patterns, may be false, in comparison to a theoretical pattern. Using the currently used bandwidth additions, this cannot perform an FEC.

Other advantageous developments and features of various embodiments of the invention are deduced from the detailed description and drawings below, as well as the various dependent claims.

BRIEF DESCRIPTION OF THE DRAWINGS

The invention is explained in more detail below with the aid of the embodiment examples shown in the drawings.

DETAILED DESCRIPTION OF PREFERRED EMBODIMENTS

Figure 1:
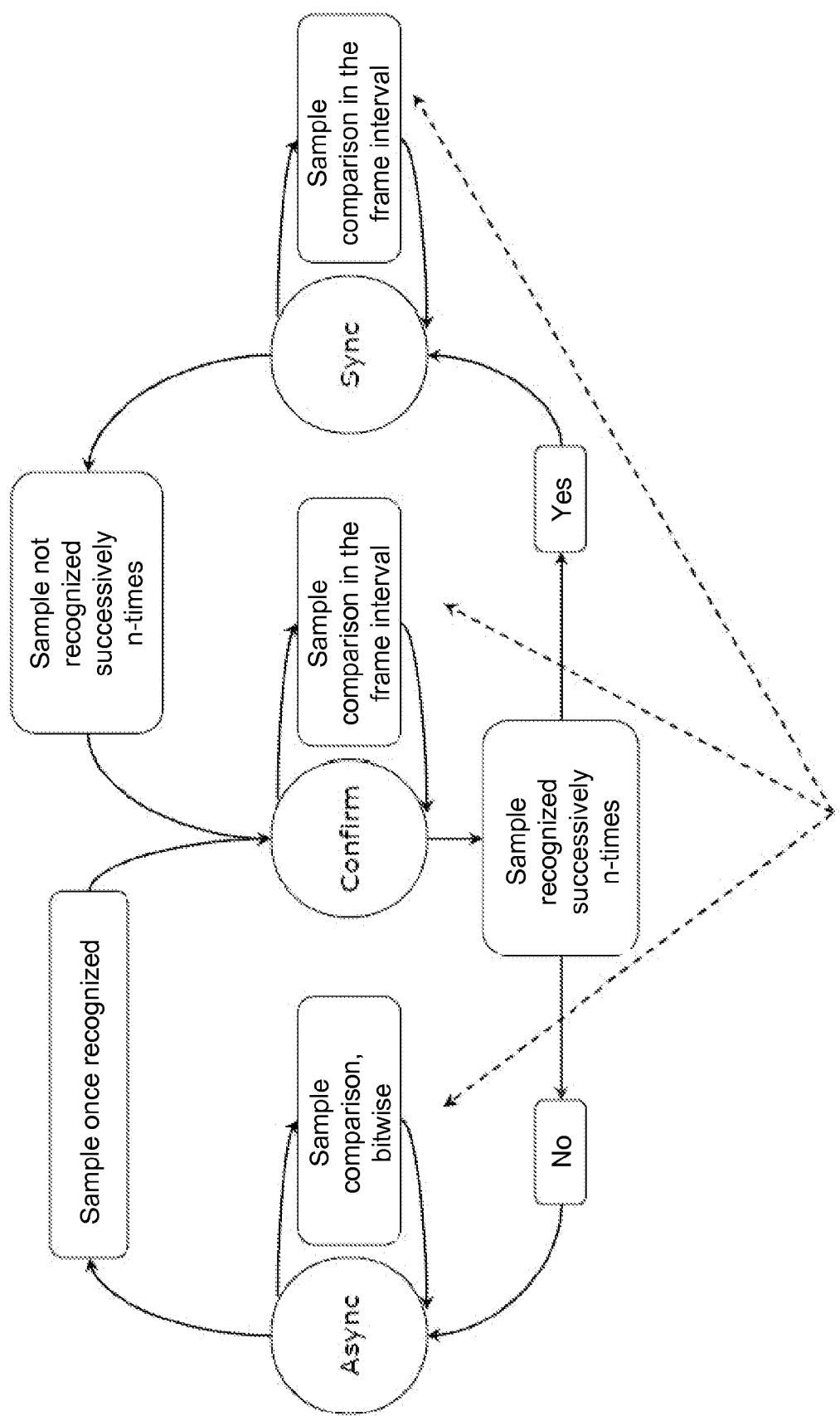
FIG. 1 is a schematic block diagram representation of a state machine for frame alignment.
Figure 2:
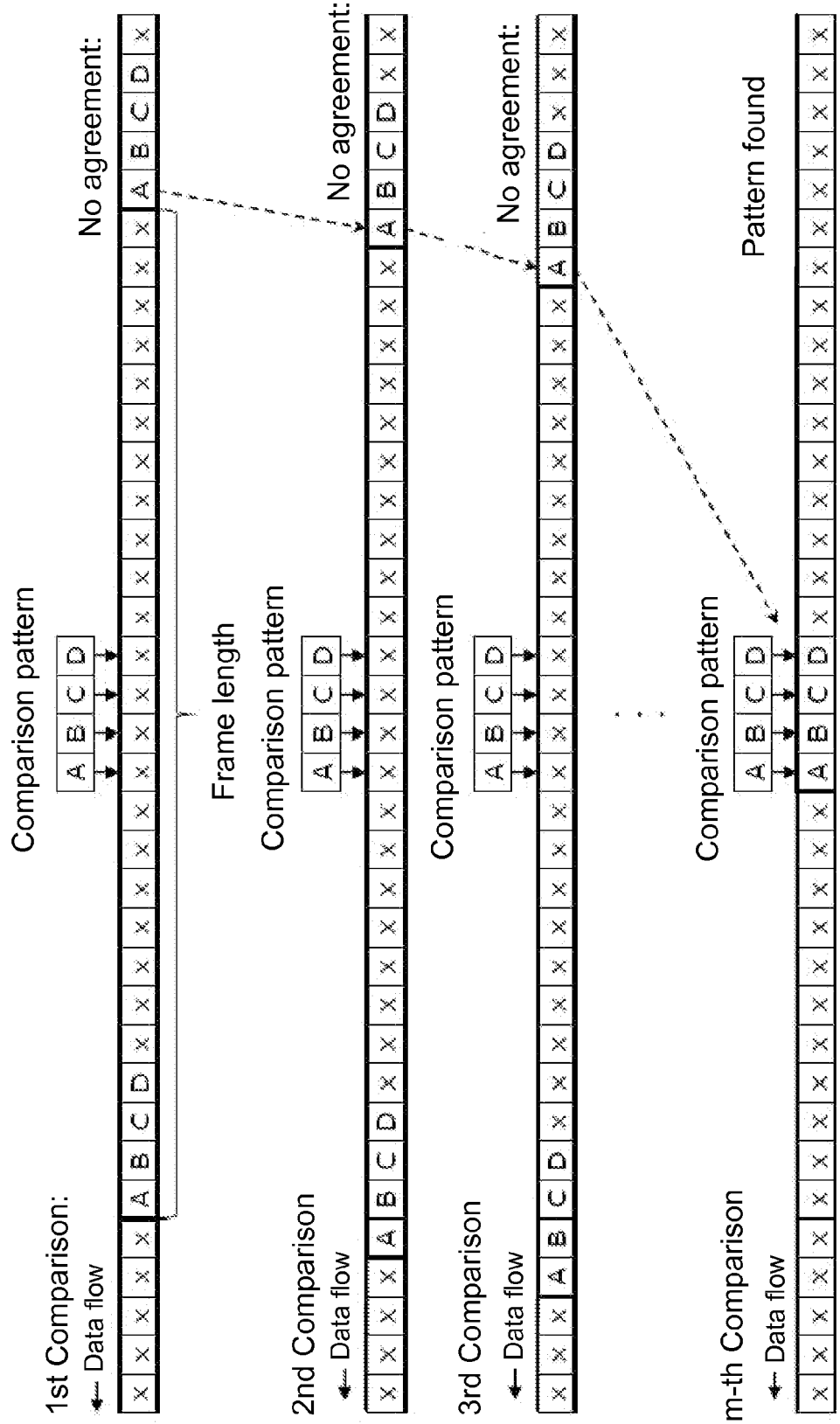
FIG. 2 is a schematic representation of a pattern comparison.

In a first embodiment example, the synchronization takes place with a state machine as described in FIG. 1 and described in the preceding, with a synchronization with adaptive, error-tolerant pattern recognition, in accordance with the invention. The difference with respect to known methods is found in the manner in which the bit pattern or an actual bit pattern is compared with a theoretical pattern. Up to now, a determination has been made in each comparison whether the bit pattern is identical or if the Hamming distance lies within a certain limit.

With the new error-tolerant method, on the other hand, a synchronization can also be attained under extreme conditions by varying the permitted Hamming distance. To this end, the theoretical and the actual bit patterns are compared bit by bit. The number of erroneous bits is thereby recorded.

The problem hereby is that this error addition must take place in real time—that is, within a cycle of the state machine. A pattern comparison in this time is trivial, but the calculation of the sum of erroneous bits in a bit pattern requires more than that. First, the erroneous bits must be detected; then a multiple addition is necessary. Subsequently, a comparison of the number of errors found with the previously established, admissible number of errors must be undertaken. In actual practice with data rates in a high gigabit area, the state machines work with frequencies around 170 MHz and higher. This means that the recording and calculation of the erroneous bits must take place in less than 170 millionths of a second (=5.9 ns). This is also problematic with the quickest currently available logic.

One method as to how the problem can be solved under these conditions works in the following manner:

Each bit in the bit pattern to be tested is linked with the corresponding bit in the comparison mask via a logical XOR function. As a result, one receives a vector with a "1" for different bits and a "0" for the same bits at the corresponding bit position. The results of the individual bit comparison must then be added, so as to obtain the number of erroneous bits. Here, the problem exists that a bit addition requires a logic which consists of one or more (full) adders. These adders must be cascaded with longer bit patterns and thus larger possible bit error numbers. Previous solutions in discrete logic were therefore not quick enough at high data rates. As an alternative, one used tables in the form of one or more storage units for the addition. The storage unit works with address inputs and data outputs. In order to implement a bit addition with the aid of a storage unit, each data word forms the sum of the set bits of its address word. Thus, the result of the XOR operation mentioned above can simply be applied to the storage unit and the sum of the set bit appears at the output of the storage unit. However, all bit variants must be present as addresses. That requires relatively large tables with long sync patterns. With integrated RAMs, this is, first of all, not a problem in principle. However, when using integrated storage units (RAMs) in FPGAs, the data must however be routed there and the results must be routed back again. This can lead to the time requirements not being fulfilled.

For the solution of these problems, "Look-Up-Tables," for example, can be used. These Look-Up-Tables are a component of the basic logic, which is distributed on the surface, over the entire chip. By a corresponding programming, it is possible to form full adders, cascading from Look-Up-Tables. For an optimization of the calculation time, the work is carried out with several partial additions in the addition of the bit errors. The result vector of the XOR operation is broken down into several parts. They are then added in parallel with the aid of the Look-Up-Tables. Since small summands are always used in these additions, one can work very well with Look-Up-Tables. By the parallelizing of the operations, the calculation, moreover, can be carried out very quickly. At the end, the results of the partial additions are, in turn, added up to form the total sum. That can also be done with Look-Up-Tables. By a variation of the number of the intermediate results and the number of the added-up parts from the individual bit comparisons, it is possible to optimize the method in such a way that the strict time requirements can be fulfilled. After receiving the error sum, it is compared with the prespecified, admissible maximum error number and correspondingly evaluated. All of this takes place within a frame cycle. The bit pattern testing can also be distributed over several cycles. However, this requires a special adaptation of the data frame and the state machine.

Advantageously, the method in accordance with the invention functions with each standard protocol. However, each proprietary protocol can also be improved with respect to the synchronization performance. The method is, moreover, adaptive, because a determination can be made as to how many erroneous bits are admissible.

In actual practice, bit errors are corrected at high data rates by means of error correction methods (FEC-Forward-Error-Correction). These methods can correct bit errors within certain limits. An FEC-error correction, however, can, as a rule, take place only after the data frame synchronization. The error rates which can be corrected with currently available FEC mechanisms lie in a range in which traditional synchronization methods still function. However, they do not function with the startup or booting of complex systems every time they are turned on. Multiple adjustments are necessary, especially with higher-value modulation methods: for example, phase and amplitude adaptation of parallel sender channels which form one symbol; adaptation of the laser-polarization planes before the optical modulators; adjustment of the scanning thresholds to the optical recipients; optimization of the scanning thresholds and other reception parameters for the electrical high-frequency deserializing; optimization of the optical performance at several sites and much more. The individual parameters are often dependent on one another. The bit error rate is not measurable in the unbalanced system. The FEC cannot yet function here either. Therefore, there is no indication for a targeted parameter adjustment. With the aid of the adaptive, error-tolerant pattern recognition, one can find a beginning here.

By a stepwise increase, preferably in single steps, of the admissible errors in the data frame head, a synchronization can be attained. That also works with permanent errors in the data frame head. As a rule, one starts here with an initial value "0," wherein, however, it is also conceivable, especially with previously known minimum errors or those which can be estimated, to begin with a higher value.

If the admissible number of errors is too small, a synchronization cannot take place with a higher number of errors in the sync pattern; if the admissible number of errors is too large, in particular, equal to or greater than half the length of the bit pattern [>(½ n-1)], then it is possible that from the "async status," the state machine is incorrectly synchronized with respect to bit patterns in the data field.

By the varying of the admissible number of errors, in accordance with the invention, the optimal value can be found in that the synchronization state is permanently observed and optimized. If the work is done upon booting the system with PRBS generators on the sender and PRBS error counters, on the recipient, an observation of the error counters can also be carried out parallel to this. It is also possible to use protocol functions which are available for an error evaluation of the transmission distances.

Now, the individual system parameters can be optimized. For higher-value modulation methods, the following, for example, are valid as such:

On the transmission side:
  Adjustment of the high-frequency amplifiers for the various modulation branches
  Amplitude adaptation of the amplitude-modulating signals among one another
  Amplitude adaptation of the amplitude-modulated signals to the phase-modulated signals
  Synchronization of the reference cycles for modulators, high-frequency ICs, derived from one source and divided in different ways
  Coordination of the cycles to the individual signals
  Coordination of the laser polarization planes of the various modulation branches
  Phase and amplitude adaptation of the additionally required modulators for RZ operation (Modulation mode: Return to Zero)
  Adjustment of amplitude and phase ratio of the individual modulation branches
  Adjustments of the transmission parameters of the high-frequency serializer:
    Phases
    Amplitudes
    Internal settings
      Phase relationship between the internal transmission channels
      Output amplification
      etc.
  Adjustment of the amplification of the optical amplifiers on the line and the reception side
  Adjustment of the amplification and the scanning thresholds on the individual optical recipients
  Adjustment of the reception parameters on the high-frequency deserializers:
    Phases
    Amplitudes
    Internal settings
    Phase relationship between the internal scanning channels
    Input amplification of the individual internal scanning channels
    Adjustments of the PLLs:
      System parameters of the individual PLL input stages
      etc.

By controlling the synchronization state and/or the error counters, it is now possible to examine whether the change of the individual parameter leads to an improvement or a worsening of the transmission. By optimizing the transmission characteristics in this manner, one attains an error rate in which the FEC can work. At the end, the admissible error rate can be adapted to the now minimized error rate in the data frame head and the system is optimally adjusted. Here, for example, it is possible to carry out a step-by-step reduction by "−1," until there is no recognition and the next-to-the-last value can be set as the optimal admissible maximum error number.

The method in accordance with the invention is not only helpful with the booting of the systems and the optimizing of the system parameters. Even if the transmission characteristics of the line worsen suddenly over longer periods of time during operation, traditional systems lose the data frame synchronization much earlier compared to systems with adaptive, error-tolerant pattern recognition. That means that here, the FEC can work much longer. To this end, it is advantageous not to allow the admissible number of errors in the data frame head to be reduced or not to be reduced too much after the optimization.

The probability of finding the bit pattern in the data frame head which is most similar to the sought bit pattern is higher than is the case in the remaining data frame. In addition, the data frame length is evaluated in the "pre-sync-" or "sync state." If the admissible number of errors was optimized, this probability is at its highest level. It is not possible to specify, from the very beginning, a fixed admissible number of errors, since it is not known what the useful data look like—that is, the bit patterns in the data field are not foreseeable. It is also possible that the bit errors accumulate at certain sites in the frame, which can depend on the modulation method, the data bit pattern, or the parameter adjustments. The optimization of the synchronization state should therefore always take place in such a manner that the number of the admissible errors increases from zero upwards, until a synchronization takes place. Now the state machine tests only the sync pattern in the data frame head. As long as the actual number of errors in the data frame head is smaller than the admissible number of errors, the synchronization state is no longer abandoned. The state machine hereby permits a defined maximum number of failed tests. If the number of errors in the data frame head rises sometime above the admissible number, then the "async status" is again assumed after the pre-sync status (with a defined number of permitted erroneous comparisons), and the search for the sync pattern begins from the beginning. To this end, the data flow is again shifted bit-by-bit and the sync pattern is thereby sought.

If one increases the admissible number of errors in the "sync state," the probability that this state is again abandoned is reduced. Should the number of errors, however, rise sometime in such a manner that the "sync state" changes to the "async state," it may occur that the sync state can no longer be attained, because the state machine rests on the next pattern in the data frame which fulfills the error tolerance conditions. The sync state is then assumed, and is no longer abandoned, as long as the number of errors in the false pattern remains smaller than the admissible number of errors.

For each system, therefore, the admissible number of errors for the data frame head is set in such a way that the error tolerance is sufficient so as to lead to a reliable synchronization, but, on the other hand, an erroneous synchronization with respect to data cannot occur either. With optimized systems—that is, with a minimized bit error rate—therefore, the admissible number of errors should be reduced enough so that a reliable synchronization with respect to the sync pattern always takes place and, at the same time, a synchronization with respect to the data is prevented.

In order to obtain the cycle from the data and thus to correctly scan it on the recipient, so-called Clock and Data Recoveries (CDR) are used. These components are used, and also integrated, as individual components. There are various ways to obtain the cycle from the data. In actual practice, however, only one method is widely used. A roughly coordinated PLL (Phase-Locked-Loop) is acted on with a signal, which is obtained by rectification of the data signal. The PLL then engages with the data frequency and delivers a cycle which has the same frequency and is phase-locked to the data signal. Poor signal qualities can also have a negative effect on the engagement behavior of the CDR. The greatest problem hereby has to do with long zero sequences or long one sequence. Nowadays, the CDRs are so dimensioned that up to 150 successive zeros or ones do not yet lead to disengagement. The CDR engages with a permanent reference cycle, if there is no data signal. As soon as there are data, the CDR engages with the data, wherein the data range must lie in the capture range of mostly +/−1000 ppm of the specification frequency. This capture range is usually limited with the aid of a filter. Thus, it is guaranteed that the CDR cannot engage false data rates. Because of these characteristics, the engagement of the CDR is also guaranteed with a very noisy (afflicted with very high bit errors) input signal. The prerequisite for the use of the adaptive, error-tolerant pattern recognition is thus given.

In summary, the following advantages may be realized, under appropriate circumstances, by employing a synchronization with adaptive, error-tolerant pattern recognition, in accordance with the invention:

a) By using adaptive, error-tolerant pattern recognition, a data transmission at high and highest bit error rates is possible.

b) Likewise, with the aid of this method, the startup and optimization of data transmission systems can be made possible.

c) Moreover, the Hamming distance can be calculated and evaluated with the aid of the logic described in the preceding, at the highest speed. The addition operations required for the purpose take place with the aid of Look-Up-Tables. Traditional methods permitted, at high data rates >40 Gbps, only one comparison with a fixed Hamming distance specification, wherein this specification is limited to 0.1 and >1. The logic presented is then able to calculate any possible Hamming distance and to make comparisons with a variable value in real time.

d) Furthermore, the necessary calculation speed can be attained by splitting the addition into several parallel operations with a divided comparison pattern.

e) All standard protocols with sufficiently long synchronization words are supported by the method.

f) OTN standard—real with OTU-4/ODU-4; 100 G data rates:

OTN frames according to ITU_T G.709 can also be received and synchronized under certain conditions, in which, up to now, the usual synchronization methods have failed: Here, the OA1 (=1110110) and O42 (=00101000) bytes, which frequently occur as a Frame Alignment Signal (FAS OH byte) in the Frame Alignment Overhead of the OTUk/ODUk frames, are used for the synchronization. That is done with the usual state machines. Instead of the sync pattern test, only the comparison of fixed patterns by the mechanism error-tolerant pattern recognition is used. That is possible, without any problems, with programmable logic. Then, by varying the permissible number of errors in the sync pattern, a synchronization can be attained under the most adverse conditions.

g) In the SDH/SONET range, the so-called A1 (=11110110) and A2 (=00101000) bytes exist. It is noticeable that the synchronization bit patterns of SDH/SONET and OTN are identical. The procedure for the application of the error-tolerant pattern recognition is the same here as described under f).

h) Ethernet: In the ethernet world, at data rates up to 1 Gigabit/second (Gb/s), so-called comma signs are used for the synchronization. These comma signs (K28.5=10111100) are used in combination with other bit sequences, so as to form, for example, the start of the frames (SOF=Start of Frame), the end of the frame (EOF=End of Frame), idles, or other control signs. SOF consists, for example, of 4 defined bytes, led by a K28.5. For the use of the adaptive, error-tolerant pattern recognition for ethernet frames to 1 Gb/s, one can synchronize with this bit pattern.

i) Fiber channel: With fiber channel protocols, the K28.5 comma signs likewise exist. The control words differ somewhat from the ethernet protocol. However, here too, the K28.5 byte is always the first of 3 additional dedicated bytes. Thus, one always has 4 bytes as a synchronization possibility also.

j) 10 G ethernet: At a data rate of 10 Gigabit ethernet, the 64B/66B coding, for example, is used instead of the 8B/10B coding. This coding permits a savings in bandwidth. The bandwidth addition (overhead) for the coding here is only approximately 3%, in comparison to 25%, with the 8B/10B coding. The synchronization takes place over the first two bits (preamble) in the frame. Coding: If the preamble is 01, then the following 64 bits are useful data. If the preamble is 10, then a so-called 8-bit type field follows and subsequently, 56-bit control and guiding information, whose significance is based on the type field. The preambles 00 and 11 are not used and produce errors in the reception. The use of the adaptive, error-tolerant pattern recognition is somewhat more complicated here, since only 2 bits are available as the synchronization pattern. Additionally, the type field must be evaluated. 15-byte types are defined. Thus, 15 permitted 10-bit-wide sync patterns exist for control and guiding information. These variants can be tested in the comparison.

k) 10 G fiber channel: The 10 G fiber channel protocol likewise works with the 64B/66B coding. Here, the same is valid as with the 10 G ethernet for the use of the adaptive, error-tolerant pattern recognition.

l) 40 G/100 G: At data rates of 40 Gb/s-100 Gb/s, complex frames are used (see 6.1 f-ITU_T G.709). The procedure is already described under f).

m) Video: Video data flows were analogously transmitted in the beginning. Nowadays, videos are digital. Usually, the ethernet is used as the transmission protocol. Thus, all prerequisites are again given for the use of the adaptive, error-tolerant pattern recognition, as described under h) ethernet.

n) Sign search methods: Sign search and comparison methods, as, for example, searches in texts or patterns in storage units, normally work with microprocessors. This can calculate the Hamming distance, in the usual manner, with the aid of the internal calculator. By using programmable logic (FPGAs) and implementing the adaptive, error-tolerant pattern recognition, a clear increase in the calculation speed and, in addition, an adaptive error tolerance can be attained here.

o) The startup and parameter adjustment of complex systems with higher-value modulation, at high bit error rates, are clearly facilitated or first made possible with the aid of the adaptive, error-tolerant pattern recognition.

p) If the transmission characteristics of the stretch in operation worsen suddenly or over longer time periods, traditional systems lose the data frame synchronization much earlier compared to systems with adaptive error-tolerant pattern recognition.

q) Other considerable improvements of the synchronization behavior are possible, by varying the admissible erroneous recognitions of the sync pattern in the sync state, and the variation of the necessary successful recognitions before the sync state is assumed—in connection with the variation of the admissible Hamming distance of the sync pattern in the data flow, in comparison to the comparison pattern.

In a second embodiment example, a data rate adaptation takes place with the adaptive, error-tolerant pattern recognition in accordance with the invention.

In the multiplexing of several data channels (clients) into one data frame, a data rate adaptation for the transmission stretch (line) is needed. This generally occurs by means of FIFOs (First-In-First-Out storage unit) at each client entry, as follows: The entering data are written, at the individual client data rate, into the FIFO. One obtains the corresponding cycle with a so-called Clock and Data Recovery component (CDR). With the line cycle (obtained from a fixed cycle source), the data are read from the FIFO and packed into the data frame. If the FIFO fill level falls below a defined value, then, instead of data, filling lines (idles) are written at corresponding sites in the data frame. In this way, the fill level again rises. The length of the data frame is dimensioned in such a manner that, in this way, the different data rates of client and line side can be balanced.

On the reception side, these filling lines must again be removed, so as to obtain a continuous data flow. The designation whether there are idles or data at the corresponding sites takes place in additional fields by one or more bits. If these fields are erroneous, either data are incorrectly removed or idles are sent on as data. Either leads to a larger number of subsequent errors, since, at the same time, the data rate adaptation also fails for a certain time. Traditional methods for the data-idle recognition also work here as in the data frame head recognition with fixed bit patterns without error tolerance. An additional complicating factor with the data-idle recognition is that here it is not possible to work with state machines via several data frame passages.

The bit pattern comes by only once and must immediately be recognized as a data or idle designation. At high bit error rates and correspondingly high bit errors in the data-idle designation field, that leads to considerable problems during data transmission. Here, too, the adaptive, error-tolerant pattern recognition can help: The data-idle designation field is larger than one bit. The bit pattern comparison takes place in such a manner that, again, each bit is tested individually. Subsequently, an adding up of the erroneously and/or the correctly recognized bits takes place. The number of the erroneous bits, in comparison to the number of the correctly recognized bits, then gives information as to whether this higher probability is a data or idle designation. Therefore, this method advantageous works reliably even if approximately every second bit is wrong. Traditional methods, on the other hand, work erroneously even if only one bit in the data-idle designation field is wrong.

In summary, the following advantages are produced in a data rate adaptation with the adaptive, error-tolerant pattern recognition in accordance with the invention:

a) The data rate adaptation, needed with every serial or multiplexed data transmission, utilizing the adaptive, error-tolerant pattern recognition, is considerably more robust, in comparison to bit errors which are caused, for example, by poor transmission characteristics.

b) Moreover, wrong error rates, caused by error-interpreted idle data fields, can be completely prevented with the aid of the adaptive, error-tolerant pattern recognition, up to error rates of close to 0.5 (every second bit is wrong).

c) Furthermore, subsequent errors in otherwise continuous data flow, caused by the erroneous interpretation of data as idles or vice-versa, up to error rates of close to 0.5, can also be completely prevented.

Of course, the method in accordance with the invention is not limited to the explained embodiment example, but rather can also be used in other cases.

In the following, other developments are explained with the adaptive, error-tolerant pattern recognition in accordance with the invention:

1. For example, future error correction methods with an error correction potential which is clearly above the possibilities available up to now are conceivable. These then require a correspondingly efficient data frame synchronization. This is available already today with the adaptive, error-tolerant pattern recognition in accordance with the invention. Thus, data transmissions in which the bit error rate is so high that traditional synchronization mechanisms no longer function are possible.

2. If blocks are sufficiently present in the data frame head—mostly additional unused blocks are provided even with standard protocols—an FEC can be used additionally for the data frame synchronization. The synchronization then takes place first by means of the adaptive, error-tolerant pattern recognition. This synchronizes with the FEC-coded pattern, which is previously known. Then, this pattern is decoded with the aid of an FEC, wherein the sync pattern is available. In actual practice, not each sync pattern passing through has the same number of errors. Even at a high bit error rate, which is actually too high for the FEC, so as to make possible an error-free decoding, sync patterns can thus be made error-free with temporarily fewer bit errors. Thus, the bit error rate can be lowered, on average, in the sync pattern. The FEC decoder provides the information regarding the number of the currently corrected bit errors. By adding up this number per unit time, a value is produced, which can additionally be processed in the state machine for adaptive, error-tolerant pattern recognition. With the regulation of this value to a minimum, one has an additional parameter for the optimization of the error tolerance adaptation.

3. The synchronization can also be done in reverse. First, similar to the publication "Every Bit Counts—Frame Synchronization in Jet Propulsion Laboratory's Advance Multi-Mission Operations System (AMMOS)," Elizabeth (Betsy) Wilson, Jet Propulsion Laboratory, a bitwise constant FEC decoding of the FEC-coded sync patterns is carried out. Parallel to this, the state machine of the adaptive, error-tolerant pattern recognition is running. A synchronization can, in turn, take place by varying the permissible Hamming distance with a simultaneous minimizing of the corrected FEC errors.

4. In programmable components, there is often no place for an EFEC (Enhanced Forward Error Correction) for the useful data. This EFEC methods are particularly efficient, always require a lot of logic, but are needed at high bit error rates. Certain blocks which are used for additional operating data, alarms, or internal communication exist in every data frame. Since these blocks are very small, in comparison to the useful data, the data transmission functions can also be improved here only for these blocks with the aid of an FEC or EFEC. The synchronization takes place as described, in the preceding, under 2. or 3. Thus, for example, internal data channels between the recipient and the sender can be made error-free. In this way, a parameter optimization for the optimization of the data transmission—even at otherwise high bit error rates—in the useful data flow is possible.

5. A somewhat simpler method for the reduction of the errors in the sync pattern is the use of the Hamming code for the error correction of the sync pattern. The Hamming code is a linear, error-correcting block code developed by Richard Hamming. The sync pattern is somewhat larger due to the coding in the Hamming code, but the recipient is able, in this way, to carry out an error correction. The efficiency of this bit error correction is smaller than that of an FEC or EFEC; the logic needed for this is, however, very small. Instead of an FEC or EFEC, as described under 2., 3., and 4., the Hamming coding can also be alternatively combined with the adaptive, error-tolerant pattern recognition.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method for adaptive, error-tolerant pattern recognition in transmission of digital data packets, the method comprising:

(a) detecting an actual data pattern, including several bits and at least one permanent erroneous bit, and comparing the detected actual data pattern with a theoretical data pattern comprising a synchronization pattern;

(b) detecting erroneous or correctly recognized bits in the detected actual data pattern;

(c) adding up the number of erroneous or correctly recognized bits to create an error sum reflecting the number of errors present in the detected actual data pattern;

(d) comparing the error sum with a specifiable and changeable admissible maximum number of errors allowable for determining that the detected actual pattern matches the synchronization pattern accounting for errors; and (e) dynamically changing the admissible maximum number of errors in response to system conditions until a synchronization is achieved with the actual data pattern including the at least one permanent erroneous bit, wherein the number of the admissible maximum number of errors can be increased or decreased.

2. The method of claim 1, wherein the increase or decrease of the admissible maximum number of errors is adjusted constantly and takes place step-by-step, proceeding from a specifiable initial value.

3. The method of claim 1, wherein the admissible maximum number of errors is calculated from a specifiable ratio between the error sum of the added-up erroneous bits and the number of the correctly recognized bits of a pattern.

4. The method of claim 1, wherein individual system parameters are optimized as a function of the comparison of the added-up erroneous bits of a pattern with the specifiable admissible maximum number of errors.

5. The method of claim 1, wherein the specifiable admissible maximum number of errors can be changed according to one or more pattern recognition passages up to a maximum Hamming distance of half the length (n/2) of the bit pattern.

6. An apparatus for performing a method for adaptive, error-tolerant pattern recognition in transmission of digital data packets, the apparatus comprising:

(a) means for detecting an actual data pattern, including several bits and at least one permanent erroneous bit, and comparing the detected actual data pattern with a theoretical data pattern comprising a synchronization pattern;

(b) means for detecting erroneous or correctly recognized bits in the detected actual data pattern;

(c) means for adding up the number of erroneous or correctly recognized bits to create an error sum reflecting the number of errors present in the detected actual data pattern;

(d) means for comparing the error sum with a specifiable and changeable admissible maximum number of errors allowable for determining that the detected actual pattern matches the synchronization pattern accounting for errors; and (e) means dynamically changing the admissible maximum number of errors in response to system conditions until a synchronization is achieved with the actual data pattern including the at least one permanent erroneous bit, wherein the number of the admissible maximum number of errors can be increased or decreased.

7. The apparatus of claim 6, wherein the increase or decrease of the admissible maximum number of errors is adjusted constantly and takes place step-by-step, proceeding from a specifiable initial value.

8. The apparatus of claim 6, wherein the admissible maximum number of errors is calculated from a specifiable ratio between the error sum of the added-up erroneous bits and the number of the correctly recognized bits of a pattern.

9. The apparatus of claim 6, wherein individual system parameters are optimized as a function of the comparison of the added-up erroneous bits of a pattern with the specifiable admissible maximum number of errors.

10. The apparatus of claim 6, wherein the specifiable admissible maximum number of errors can be changed according to one or more pattern recognition passages up to a maximum Hamming distance of half the length (n/2) of the bit pattern.

11. The apparatus of claim 6 in which the means for adding includes two or more partial adders fed into lookup tables from which is provided a sum.

12. The apparatus of claim 11 wherein the sum is provided within a single frame cycle.

* * * * *